Apr. 10, 1923.
J. W. PARKS
1,451,404
AUTOMOBILE FLOOR BOARD CLAMP
Filed Dec. 7, 1920
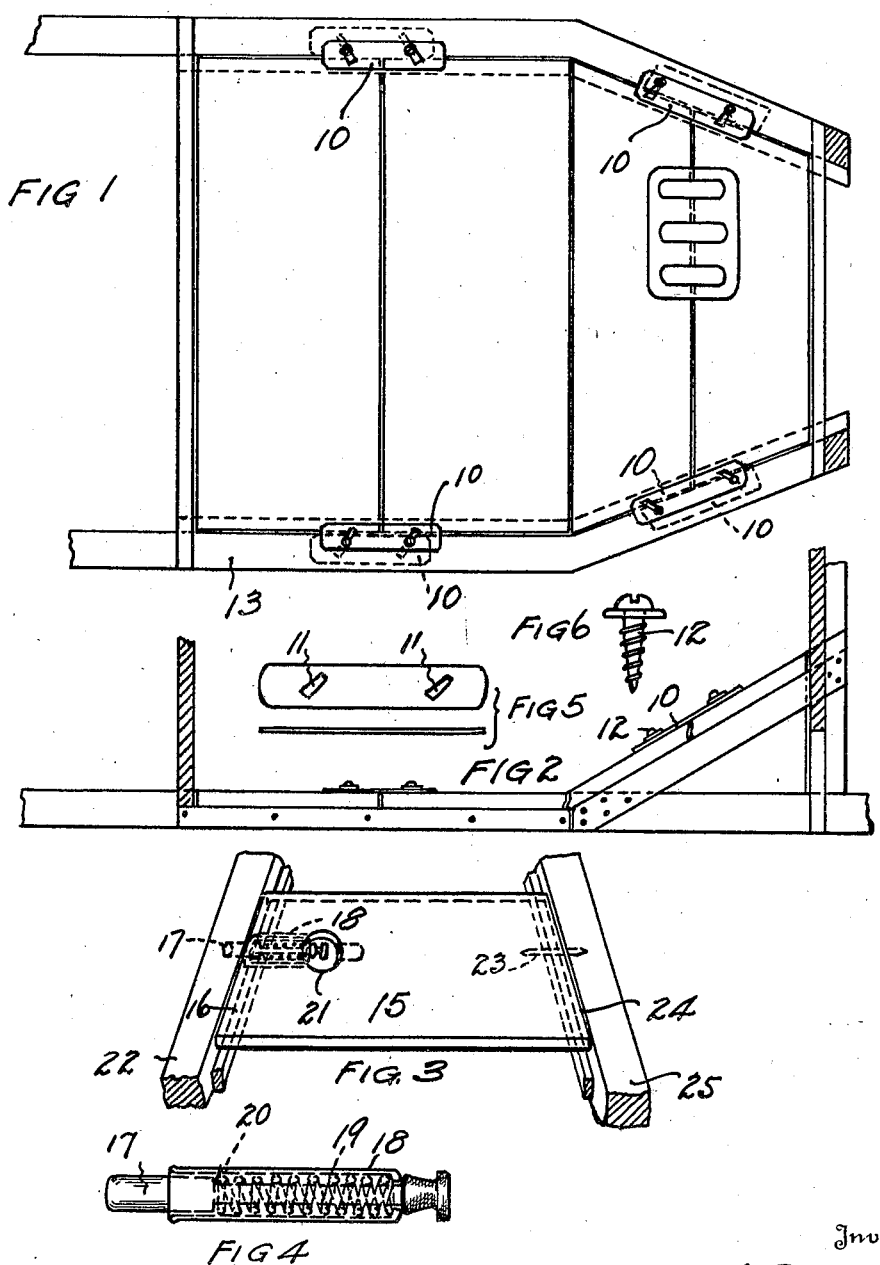
Inventor
JOSEPH W. PARKS
By N. E. Gee
Attorney Patented Apr. 10, 1923.

1,451,404

UNITED STATES PATENT OFFICE.

JOSEPH W. PARKS, OF ALTOONA, PENNSYLVANIA.

AUTOMOBILE FLOOR-BOARD CLAMP.

Application filed December 7, 1920. Serial No. 429,022.

*To all whom it may concern:*

Be it known that JOSEPH W. PARKS, a citizen of the United States, residing at Altoona, in the county of Blair and State of Pennsylvania, has invented certain new and useful Improvements in Automobile Floor-Board Clamps, of which the following is a specification.

This invention relates to motor vehicles, and has particular reference to an improved means for holding the floor boards in place on cars of the Ford and other types.

A primary object of this invention is to provide means for preventing floor boards from being jarred out of place when the car is operated over rough roads, thus insuring the free use of the foot levers when it is desired to change gears or apply the brake.

Another object of the invention is to provide an improved floor board fastening means that can be easily attached to the car in such manner that it can be readily removed from the floor boards when it is desired to remove the same from the car.

With the above and other objects in view which will more readily appear as the nature of the invention is better understood, the same consists in the novel construction, combination and arrangement of parts as will be hereinafter more fully pointed out, illustrated and claimed.

It will, of course, be understood by those skilled in the art to which this invention belongs, that the same is quite susceptible of various changes or modifications without departing from the spirit or scope of the invention, but a preferred and practical embodiment of the invention is shown in the accompanying drawings, in which:—

Figure 1 is a plan view of the floor board arrangement of a number of cars.

Figure 2 is a side elevation of the parts shown in Figure 1 of the drawings.

Figure 3 is a detail perspective view of a slight modification in the manner of securing the floor boards to the car and is intended to be used where the arrangement as shown in Figure 1 will not suffice.

Figure 4 is a detail of the board holding device as shown applied in Figure 3 of the drawings.

Figure 5 includes plan and edge views of the floor board holding means as shown applied in Figure 1 of the drawings.

Figure 6 shows a screw and washer used to hold the floor boards in position.

In carrying out this invention, no change is contemplated in the usual construction and floor board assembly as found on the Ford automobile, for example, and to this end, the invention as applied to the Ford car essentially consists of a plurality of slidable clamps or plates designated by the numeral 10, and each of which is provided with a plurality of oblique wedge shaped slots 11. These slots are, in each instance, adapted to engage a screw 12, which is provided for the purpose of holding the clamp 10 in an oblique slidable position on the auxiliary frame 13 of the car.

The screw 12 can be easily replaced by a bolt or similar fastening means, but the screw 13 is preferably used due to the ease with which it can be adjusted with reference to the slidable motion of the clamp holding plate 10. Figure 1 shows the floor boards engaged by the clamp and also shows the disengaged or inoperative position of the clamp in dotted lines.

In automobiles wherein the construction shown in Figure 1 is not readily applicable, the arrangement shown in Figure 3 may be added, and consists of a floor board 15 which is provided at one side 16 with a resilient locking plunger 17, which is fitted in a case 18 containing a resilient spring 19, one end of which abuts against the inside of the case or barrel while the other end rests upon the shoulder 20, of the locking plunger 17. An opening 21 is provided in the floor board for the purpose of disengaging the locking plunger 17 from the stationary frame part 22 of the car.

The board 15 may be further provided with a dowel pin 23 which is adapted to be fitted to the board and project from the edge 24 such as to engage the stationary frame part of the car 25.

The floor board clamps 10 are positioned on the inclined floor such that the vibrations of the car will tend to keep the clamps in position covering the edge of the movable boards, and the edge of the wedge shaped slots bind on the body of the screw 12 as the car vibrations tend to tighten the clamp on the screw.

I claim:

A lock for vehicle floor boards including in combination with the side rails of the chassis having rabbeted floor board receiving seats, abutment elements carried by the upper face of the said side rails and spaced from the upper edge of the rabbet, and a clamping plate having tapering slots fitting over the said abutments and the said slots being arranged so that their narrow ends wedge onto the abutments when the plate is shifted into position to overlie the edge of said floor boards.

In testimony whereof I affix my signature.

JOSEPH W. PARKS.